United States Patent
Schippers

[19]

[11] Patent Number: 5,507,381
[45] Date of Patent: Apr. 16, 1996

[54] METHOD FOR UNLOADING A SPACE AND DEVICE FOR PERFORMING THIS METHOD

[75] Inventor: Edward H. S. Schippers, Leusden, Netherlands

[73] Assignee: Nagron Mechanical Handling B.V., Netherlands

[21] Appl. No.: 125,366

[22] Filed: Sep. 22, 1993

[30] Foreign Application Priority Data

Sep. 23, 1992 [BE] Belgium ............................. 09200835

[51] Int. Cl.$^6$ ................................................ B65G 47/62
[52] U.S. Cl. ........................................ 198/509; 414/142.8
[58] Field of Search ........................... 414/142.8, 142.9, 414/786, 141.7; 37/340, 422, 423, 412, 417; 198/509, 701, 703

[56] References Cited

U.S. PATENT DOCUMENTS

| | | | |
|---|---|---|---|
| 717,162 | 12/1902 | Campbell | 414/142.8 |
| 1,296,201 | 3/1919 | McMyler | 414/624 X |
| 3,149,733 | 9/1964 | Joyce | 414/142.9 X |
| 4,265,036 | 5/1981 | Staats | 37/340 |

FOREIGN PATENT DOCUMENTS

| | | | |
|---|---|---|---|
| 0404273 | 12/1990 | European Pat. Off. | B63B 27/22 |
| 0427013 | 5/1991 | European Pat. Off. | E02F 3/413 |
| 1154888 | 4/1958 | France . | |
| 2712156 | 9/1978 | Germany | B65G 67/58 |
| 9108952 | 10/1991 | Germany | E02F 5/28 |
| 52-1882 | 1/1977 | Japan | 414/142.9 |
| 821591 | 10/1959 | United Kingdom | 414/142.9 |

OTHER PUBLICATIONS

Copy Faxed to Applicant on Apr. 12, 1995.

*Primary Examiner*—William E. Terrell
*Assistant Examiner*—Janice L. Krizek
*Attorney, Agent, or Firm*—Webb Ziesenheim Bruening Logsdon Orkin & Hanson

[57] ABSTRACT

The invention provides a method for unloading a space filled with bulk material using at least one grab supported by a chassis, wherein the chassis is displaced in lengthwise direction of the space and wherein the grab is emptied above a cross conveyor, characterized in that the cross conveyor is moved reciprocally each time relative to the chassis between a receiving position situated beneath the grab and a retracted position, while in the retracted position of the cross conveyor the grab is lowered into the space and raised therefrom filled with material and opened above the cross conveyor in the receiving position of the cross conveyor. Long bites of material are thus systematically removed each time from a hold in transverse direction of the hold.

17 Claims, 4 Drawing Sheets

METHOD FOR UNLOADING A SPACE AND DEVICE FOR PERFORMING THIS METHOD

BACKGROUND OF THE INVENTION

1. Field of the Invention

The invention relates to a method for unloading a space filled with bulk material utilizing at least one grab supported by a chassis.

2. Prior Art

Such a method is known from EP-B1-0404273. Therein, the hoisting frame which bears the grab is swivelled to a position above the cross conveyor after the grab has been lifted out of the space. A rapid movement of the hoisting frame is difficult to control such that uncontrolled swinging of the grab is prevented during the swivelling movement. A rapid movement of the hoisting frame is nevertheless desired in order to shorten the unloading cycle.

It is often important in the case of spaces, particularly the holds of vessels, that they be unloaded as quickly as possible. To this end the invention provides a method for unloading a space filled with bulk material.

The invention also relates to and provides a device for unloading a space filled with bulk material.

SUMMARY OF THE INVENTION

The present invention provides a method for unloading a space filled with bulk material using at least one grab supported by a chassis, wherein the chassis is displaced in lengthwise direction of the space and wherein the grab is emptied above a cross conveyor. The present method provides that the cross conveyor is moved reciprocally each time relative to the chassis between a receiving position situated beneath the grab and a retracted position. While the cross conveyor is in the retracted position, the grab is lowered into the space and raised therefrom full of bulk material. The grab is then opened above the cross conveyor which has been moved to a receiving position. The device of the present invention includes an unloading device disposed close to the space filled with bulk material. The unloading device includes a chassis that is displaceable in a lengthwise direction of the space and is guided in the lengthwise direction on a set of rails. The chassis includes a hoisting means bearing at least one grab. The unloading device, in addition, includes at least one cross conveyor which is displaced relative to the chassis between a receiving position situated beneath the grab and a retracted position.

BRIEF DESCRIPTION OF THE DRAWINGS

Mentioned and other features of the invention will be elucidated in the description following hereinafter with reference to the drawings, in which.

DESCRIPTION OF THE PREFERRED EMBODIMENTS

Figure 10:
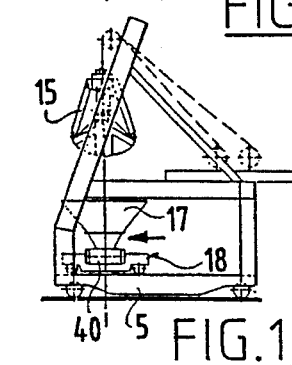
Figure 11:
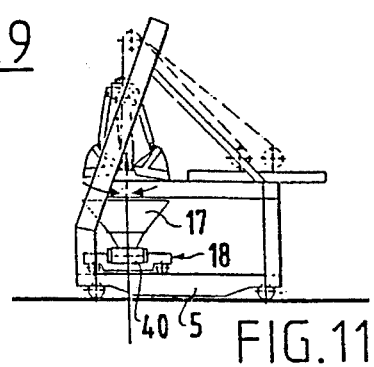
Figure 12:
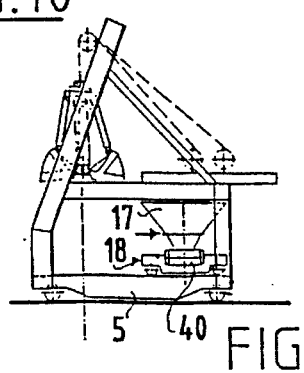

The vessel 1 comprises a hold 2 for receiving bulk material 3, for instance gravel, sand, coal, grain or other bulk material. The vessel 1 has an unloading device 4 comprising a chassis 5 which is guided by means of rails 6 in lengthwise direction of the hold 2. The wheels 7 are driven by electromotors or hydromotors 31. A hoisting frame 8 is supported by and fixedly connected to the chassis 5. The hoisting frame 8 comprises two inclining side beams 32 and two shores 33 which support the side beams 32 on two vertical columns 34, the top ends of which are connected to the inclining beams 32 by means of horizontal beams 35. The hoisting frame 8 is further completed by cross beams 36 and a winch support platform 37. A hoisting shaft 44 with pulleys 45 is mounted on the upper part of beams 32. A cross conveyor 18 is displaceable relative to the chassis 5 over rails 39 in lengthwise direction of the vessel 1 between a receiving position as shown in FIG. 10 and a retracted position under the winch support platform 37 as shown in FIG. 12. The cross conveyor 18 extends substantially over the entire width of the hold 2.

In the retracted position of the cross conveyor 18 the grab 15 suspended from the upper end of the hoisting frame 8 and operated by means of winches 11 and 12 of respectively the closing cables 13 and the hoisting cables 14 is situated adjacently of the cross conveyor 18 so that the grab 15 can be vertically raised and lowered into the hold 2. The grab 15 has a length k which is preferably slightly smaller than the breadth b of the hold 2.

In the release position the grab 15 is located above the receiving means forming part of the cross conveyor 18 and consisting of an elongate trough 17 positioned transversely of the hold 2, which trough debouches above an endless conveyor belt 40 which pours the material via a discharge chute 19 onto a lengthwise conveyor 20 disposed alongside the hold. This pours the material via a discharge chute 22 onto an outboard transporting discharge conveyor 21.

The grab 15 carries a number of ultrasonic pick-ups which signal when the distance of the opened grab 15 to the material 3 has reached a certain minimum distance. Because the grab 15 is suspended on two cables 14 arranged at a considerable mutual distance, the grab 15 remains properly positioned in the transverse direction of the hold 2.

Figure 8:
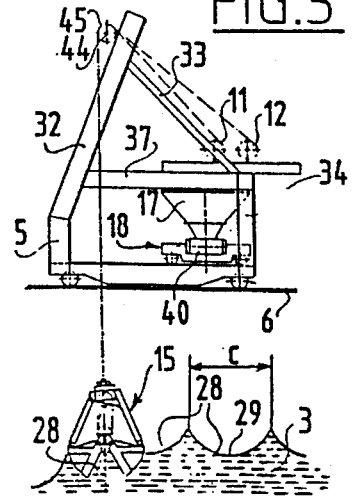
Figure 9:
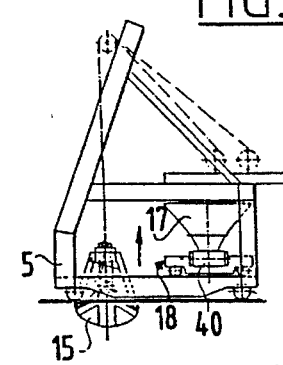

The material 3 is picked up from the hold 2 in layers wherein an elongate bite 28 extending in transverse direction and formed as according to FIG. 8 is picked up each time. The grab 15 has a well-presented bite 28 to handle with each successive layer because the hoisting positions of the chassis 5, and therewith the biting grab 15, are offset a half bite 28 with respect to those of the previous layer. The unloading method is automatically controlled by a computer.

The chassis 5 is displaced a bite breadth c after each bite 28 and in each case only one bite 28 is taken up and unloaded above the trough 17. After taking and lifting the bite 28, during the displacing of the cross conveyor 18 the chassis 5 is already being moved a step in the length of the bite breadth c so that the opened grab 15 immediately comes to lie at the correct position for the following bite 28.

Figure 1:
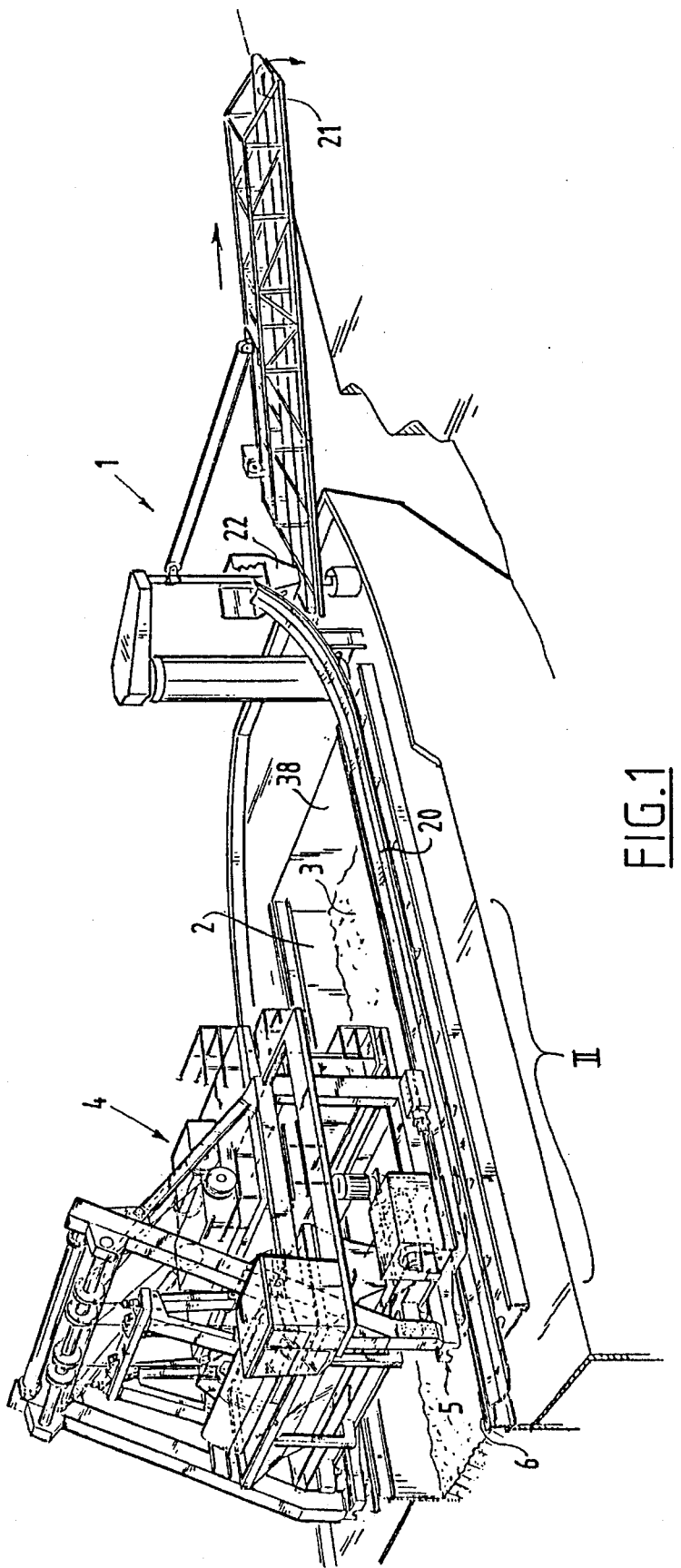
FIG. 1 shows a perspective view of the rear part of a preferred embodiment of a device according to the invention taking the form of a vessel.
Figure 2:
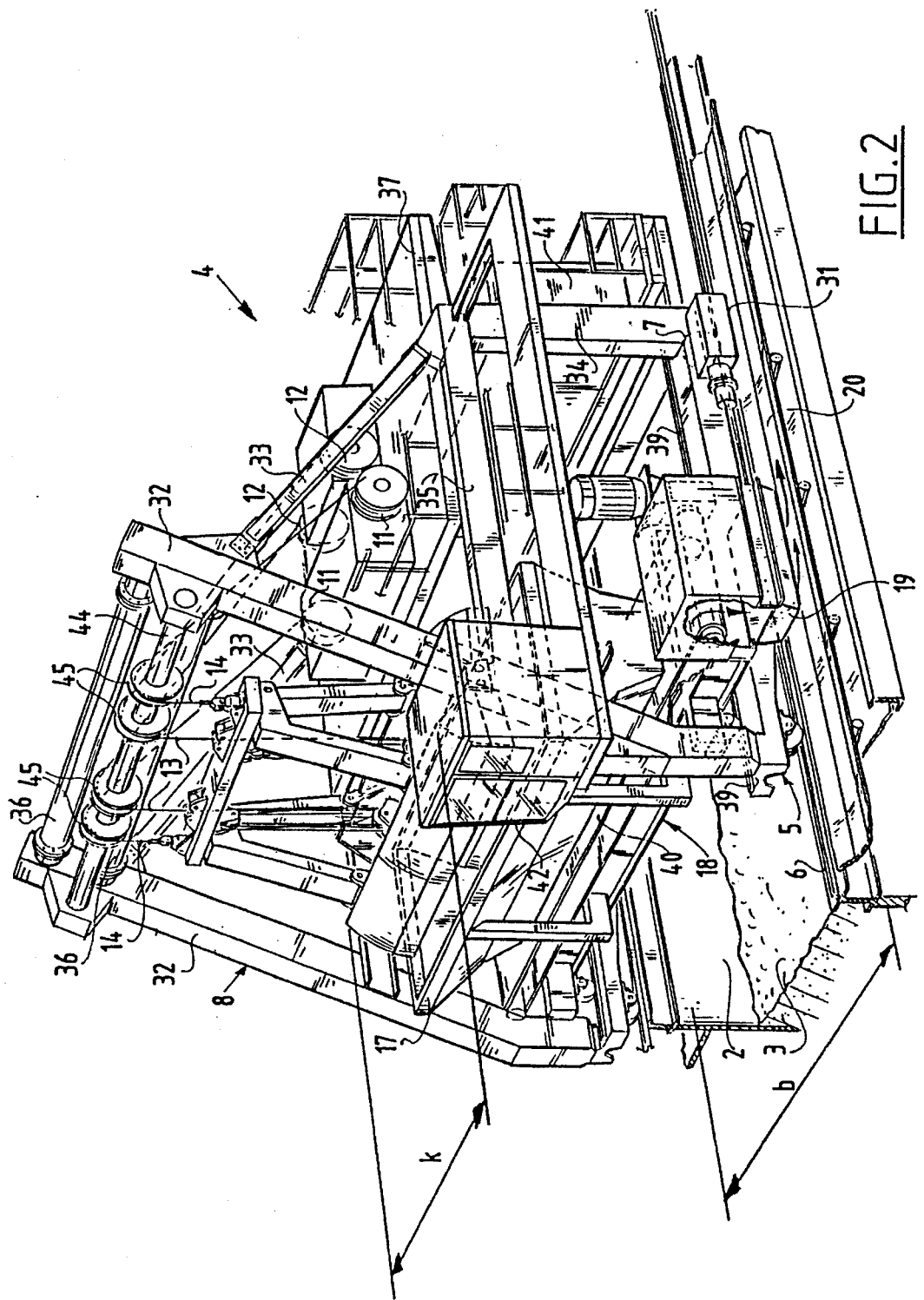
FIG. 2 shows on a larger scale portion II in FIG. 1.
Figure 3:
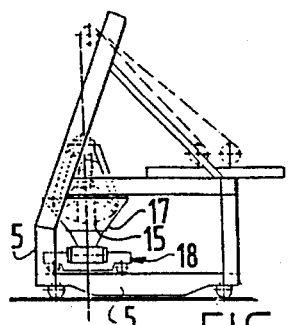
FIGS. 3–12 are schematic views of successive steps in performing the method according to the invention.
Figure 4:
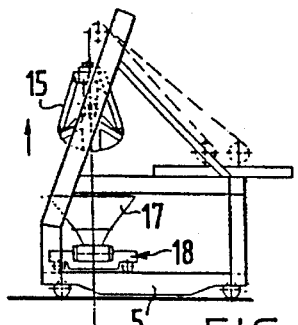
Figure 5:
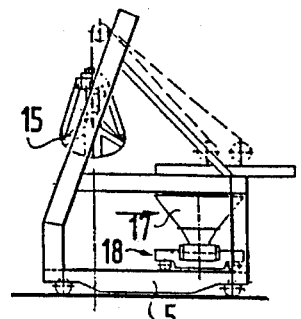
Figure 6:
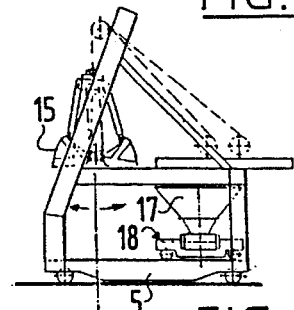
Figure 7:
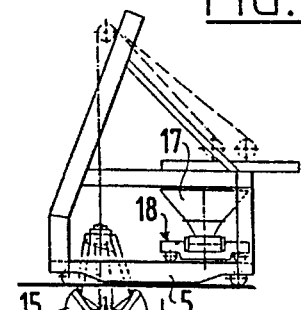

The successive method steps are depicted in FIGS. 3–12. During sailing the grab 15 is lowered into the trough 17 (FIG. 3). When unloading of the vessel 1 begins the empty grab 15 is raised (FIG. 4) and the cross conveyor 18 moved to the retracted position (FIG. 5), while the chassis 5 is moved to that location above the hold where it is desired to begin unloading. The steps of FIGS. 7–12 are repeated optionally first manually and later automatically.

Paying out of the closing and hoisting cables is stopped at the correct moment by ultrasonic pick-ups. The end of the layer is signalled by limit switches (not drawn) on the chassis when the head end walls 38 of the hold 2 are approached.

The chassis 5 carries a cabinet 41 with units and control equipment in addition to a control cabin 42.

Figure 13:
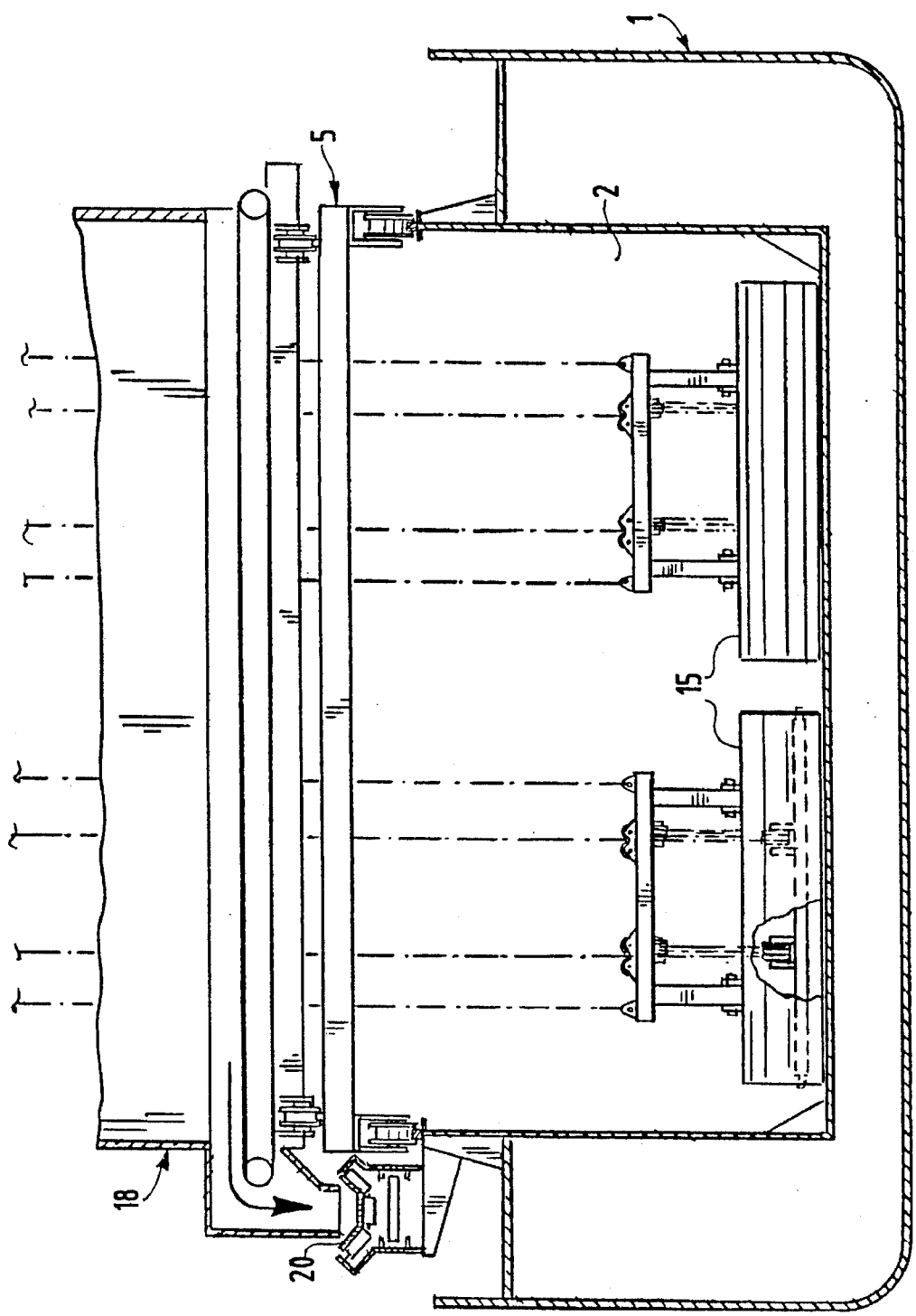
FIG. 13 shows on a larger scale a cross section of a variant of the vessel of FIG. 1.

FIG. 13 shows two grabs 15 which operate simultaneously and adjacent one another in a transverse direction of the hold 2 and which, in the case of a very broad hold 2, take from the hold 2 as it were a large bite each time consisting of pieces and simultaneously unload the material therefrom into a trough 17 of a cross conveyor 18 travelling reciprocally over the chassis 5. Use can optionally be made of more than two mutually adjacent grabs 15.

The space for emptying may be any elongate, more or less rectangular storage space, in particular a hold of a vessel, but also a basin, tank, cellar or bunker, or even a channel for excavation, of which the soil for excavation can be seen as occupying a space for emptying.

I claim:

1. A method for unloading a space which is situated within a vessel and which is filled with bulk material, said method using at least one grab supported by a chassis, wherein said chassis is displaced in a lengthwise direction of said space, wherein said grab is emptied above a cross conveyor configured to reciprocally move between a receiving position situated beneath said grab and a retracted position and wherein said cross conveyor extends over at least a portion of the space, said method comprising the steps of:

a) positioning said cross conveyor in said retracted position by displacing said cross conveyor relative to said chassis in a lengthwise direction of said space;

b) vertically lowering said grab into said space;

c) filling said grab with said bulk material;

d) vertically raising said grab from said space;

e) moving said cross conveyor to said receiving position situated beneath said grab by displacing said cross conveyor in the lengthwise direction of said space relative to said chassis; and f) emptying said bulk material from said grab above said cross conveyor, wherein said grab remains in substantially the same vertical plane relative to said chassis throughout steps a) to f).

2. The method as claimed in claim 1 further comprising the steps of:

g) moving said chassis in said lengthwise direction along said space; and h) repeating steps a) to f).

3. The method according to claim 2, further including the step of displacing said chassis a bite breadth after each bite taken by said grab.

4. The method according to claim 1, further including the step of positioning said grab in a transverse direction with respect to said space.

5. The method according to claim 1, further including the steps of positioning a plurality of grabs in a transverse direction with respect to said space; and causing said plurality of grabs to bite simultaneously.

6. The method according to claim 1, wherein said grab has a length slightly smaller than a breadth of said space.

7. A device for unloading a space which is situated within a vessel and which is filled with bulk material, said device comprising an unloading device which is disposed close to the space, said unloading device including rails extending lengthwise along the space, a chassis displaceable along said rails, hoisting means supported on said chassis, at least one vertically displaceable grab supported by said hoisting means, and a cross conveyor supported on said chassis and adapted to transport the bulk material to the side of said space in a direction transverse to the lengthwise direction of said space, said cross conveyor extending over at least a portion of said space and displaceable relative to said chassis between a receiving position situated beneath said grab and a retracted position by displacing said cross conveyor in the lengthwise direction of said space relative to said chassis.

8. The device as claimed in claim 7, wherein said hoisting means includes a hoisting frame supported by said chassis and from which said grab is suspended, wherein said hoisting frame has, on at least one side thereof, a free passage for said movement of said cross conveyor relative to said chassis.

9. The device as claimed in claim 8 further including a control cabin supported on said chassis.

10. The device as claimed in claim 7 further including a control cabin supported on said chassis.

11. The device as claimed in claim 7 further including rail means for supporting and guiding said cross conveyor.

12. The device as claimed in claim 7, wherein said grab extends in a transverse direction with respect to said space.

13. The device as claimed in claim 7, wherein said grab has a length slightly smaller than a breadth of said space.

14. A device for unloading a space filled with bulk material, said device comprising:

an unloading device which is disposed close to the space, said unloading device including rails extending lengthwise along said space, a chassis displaceable along said rails, hoisting means supported on said chassis, a plurality of vertically displaceable grabs supported by said hoisting means, wherein said plurality of grabs are positioned transverse to said space and wherein said grabs are configured to bite simultaneously, and a cross conveyor supported on said chassis, extending over at least a portion of said space and displaceable relative to said chassis between a receiving position situated beneath said grab and a retracted position by displacing said cross conveyor in the lengthwise direction of said space relative to said chassis.

15. A device for unloading a space which is situated within a vessel and which is filled with bulk material, said device comprising:

rails extending lengthwise along said space;

a chassis displaceable along said rails;

a control cabin supported on said chassis;

hoisting means supported on said chassis;

at least one vertically displaceable grab supported by said hoisting means;

a cross conveyor displaceable relative to said chassis between a receiving position situated beneath said grab and a retracted position by displacing said cross conveyor in the lengthwise direction of said space relative to said chassis, the longitudinal extent of said cross conveyor disposed along a transverse direction of said space and said cross conveyor adapted to transport the bulk material to the side of the space in a direction transverse to the lengthwise direction of said space; and rail means for supporting and guiding said cross conveyor, wherein said hoisting means includes a hoisting frame supported by said chassis and from which said grab is suspended, and wherein said hoisting frame has, on at least one side thereof, a free passage for movement of said cross conveyor relative to said chassis.

16. The device as claimed in claim 15, wherein said grab has a length slightly smaller than a breadth of said space.

17. The device as claimed in claim 16, wherein said cross conveyor extends substantially over the entire width of said space.

\* \* \* \* \*